Oct. 13, 1925.                              1,556,745
R. R. BANTA
PIPE CONNECTION
Filed Jan. 5, 1924
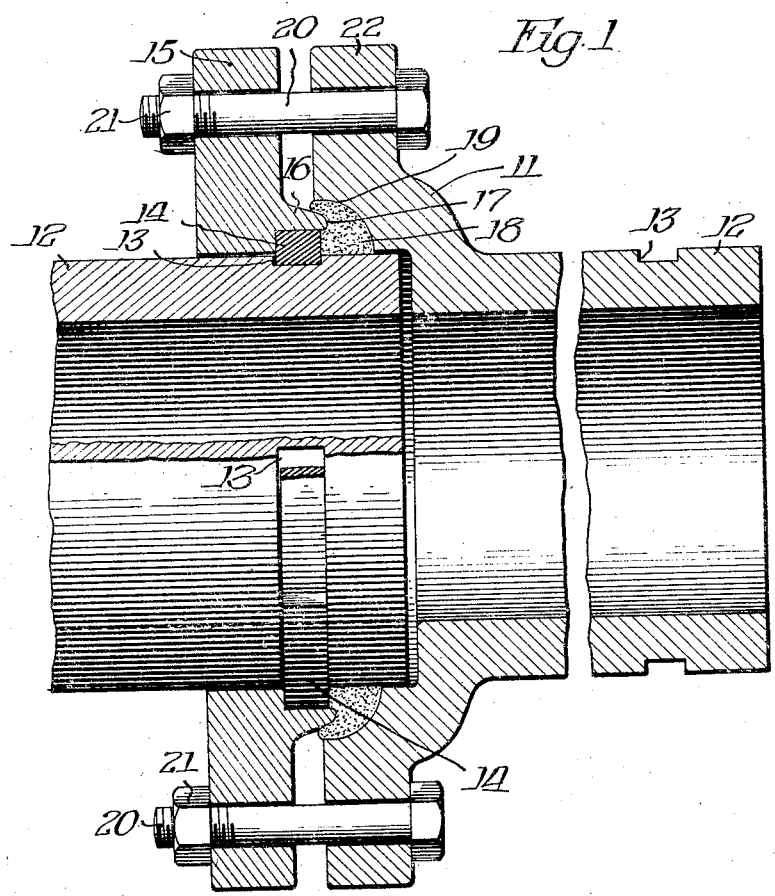
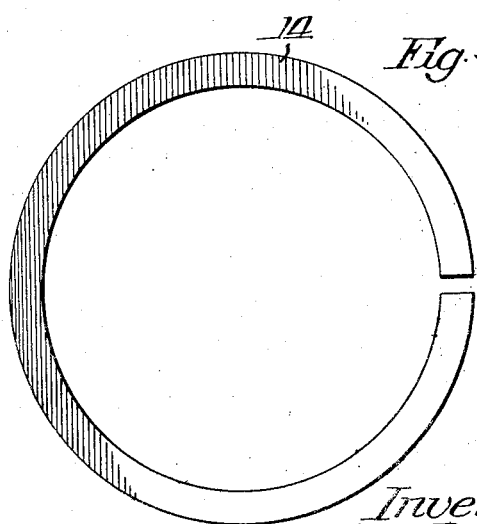
Inventor
Robert R. Banta, Patented Oct. 13, 1925.

1,556,745

UNITED STATES PATENT OFFICE.

ROBERT R. BANTA, OF CHICAGO, ILLINOIS.

PIPE CONNECTION.

Application filed January 5, 1924. Serial No. 684,498.

*To all whom it may concern:*

Be it known that I, ROBERT R. BANTA, a citizen of the United States, residing at Chicago, in the county of Cook and State of Illinois, have invented certain new and useful Improvements in Pipe Connections, of which the following is a specification.

This invention relates to a new and improved pipe connection and more particularly to a pipe connection construction adapted to provide a leak tight joint adapted to adequately resist internal pressure in the pipe.

The pipe now in general use for carrying fluid under pressures, particularly where the pipe is in the larger sizes, consists in pipe sections and fittings having integrally formed flanges at their opposite ends. The flanges of adjacent sections or fittings are secured together by bolts passing through the flanges. The joint is made pressure tight by means of a gasket compressed between the flanges.

When this pipe is used in constructions involving various lengths of sections, its cost is excessive since the special sections must be cast to the length desired with the flanges cast integrally therewith.

Bell end pipe avoids the necessity for the casting of special lengths, since the pipe may be cut to give a spigot end at any desired length from the bell end, and all fittings are provided with bell ends upon all openings therein. Such pipes are, however, unable to handle heavy pressures since the joints are made tight only by packing the bell around the spigot end and pouring in lead.

It is an object of the present invention to provide a new and improved pipe connection adapted to furnish necessary resistance to pressure without the necessity for cast securing flanges.

It is a further object to provide a construction of this character in which certain of the connecting members are removably associated with a plain or spigot end of a pipe section.

It is also an object to provide construction in which upon joining the pipe ends a packing ring is deformed in such manner as to form a fluid tight joint.

Other and further objects will appear as the description proceeds.

I have illustrated a preferred embodiment of my invention in the accompanying drawings, in which—

Figure 1 is a section through a pipe joint constructed according to the present invention;

Figure 2 is a section through the packing ring; and

Figure 3 is a view of the split locking ring.

The form of pipe shown is provided with a bell end 11 and a spigot end 12. As clearly shown in Figure 1 the spigot end of one pipe is adapted to fit within the bell end of the adjacent pipe. The pipe has formed therein adjacent the spigot end a circumferential recess 13. Fitted in this recess is the split locking ring 14, which ring is preferably formed of resilient metal and is slipped over the spigot end of the pipe. Its resiliency holds it tightly in place in the recess 13.

The collar 15 is fitted upon the pipe adjacent the ring 14 and is provided with the lip 16 overhanging that ring. It will be further noted that the lip is wedge-shaped in cross section and the outer edge 17 of the lip extends beyond the face of the split ring 14. This edge of the lip engages the packing ring 18 and deforms it and presses it into the arcuate recess 19 in the bell end of the pipe. The parts are drawn together by the bolts 20 and nuts 21 which join the collar 15 and the flange 22 upon the bell end of the adjacent pipe. The packing ring 18 is shown in its undeformed normal condition in Figure 2.

The joint described is composed of but few parts which are simple in design and construction. It may be readily applied to pipe similar to bell end pipe of usual type, the variation from the usual type consisting in the provision of the circumferential recess 13 and of the necessary bolt holes in the flange 22. The circumferential lip 16 retains the locking ring 14 securely in place and the outer edge 17 of the lip so deforms and presses the packing ring into the bell end as to assure a fluid tight joint.

It will be understood that all fittings such as Ys, Ts, elbows, etc., will be provided with bell flanges of the type shown in Figure 1, at all of their ends. Consequently some connecting pipe sections will not be provided with bell flanges at either end. The pipe sections may be cut to any desired length and the circumferential recess 13 then cut in the pipe so that no special castings are required.

I have shown one preferred embodiment of my invention in the accompanying drawings but I contemplate such modifications and changes as come within the scope of the appended claims.

I claim:

1. In a pipe coupling, the combination with a spigot-end and a bell-end, of a flange separate from and embracing the spigot-end and having a circumferential lip extending towards the bell-end, a locking ring embracing the spigot-end and seated in an external groove therein and snugly embraced by the lip, said lip projecting beyond the outer face of said ring, the bell-end having a recess receiving the projecting portion of the lip, packing within the recess and engaged by the lip and the locking ring, and means for drawing together the spigot and bell-ends.

2. In a pipe coupling, the combination of a bell-end having a circumferential recess in the bell portion and opening through the front face of the bell, a spigot-end extending within the bell member and encircled by the recess, said spigot-end having an external circumferential groove, a flange member separate from and embracing the spigot-end in rear of the groove and provided upon its front face with a circumferential lip spaced from and extending across the groove in the spigot-end and into the recess in the bell-end, a locking ring occupying the groove and snugly embraced by the lip, packing occupying the recess and engaged by the front face of the locking ring and the outer end portion of the lip, and means for drawing together the spigot and bell members, the lip being wedge-shaped in cross-section and projecting beyond the locking ring and into the recess in the bell-end.

Signed at Chicago, Illinois, this 22nd day of December, 1923.

ROBERT R. BANTA.